(12) United States Patent
Weener et al.

(10) Patent No.: US 6,367,211 B1
(45) Date of Patent: Apr. 9, 2002

(54) FLOOR RACEWAY FOR POWER AND COMMUNICATIONS CABLES

(75) Inventors: Robert C. Weener, Holland; Jeffrey J. Reuschel, Hamilton, both of MI (US)

(73) Assignee: Haworth, Inc., Holland, MI (US)

( * ) Notice: Subject to any disclaimer, the term of this patent is extended or adjusted under 35 U.S.C. 154(b) by 0 days.

(21) Appl. No.: 08/983,646

(22) PCT Filed: Jun. 5, 1997

(86) PCT No.: PCT/US97/10573

§ 371 Date: Dec. 31, 1997

§ 102(e) Date: Dec. 31, 1997

(87) PCT Pub. No.: WO97/46773

PCT Pub. Date: Dec. 11, 1997

(51) Int. Cl.[7] .............................. E04C 2/52; H02G 3/02
(52) U.S. Cl. .................. 52/220.1; 52/220.7; 52/220.8; 248/51; 248/68.1; 174/48; 174/97; 138/120
(58) Field of Search ................ 52/220.1–220.3, 52/220.7, 220.8, 239; 248/51, 68.1, 49; 138/120–122, 135, 114–117; 59/78.1, 79.1; 174/48, 49, 68.1, 97; 439/207, 214, 215

(56) References Cited

U.S. PATENT DOCUMENTS

| | | | |
|---|---|---|---|
| 2,798,172 A | | 7/1957 | Jones |
| 3,136,515 A | * | 6/1964 | Potruch .................. 248/51 X |
| 3,424,855 A | | 1/1969 | Sharkey et al. |
| 3,485,467 A | * | 12/1969 | Fuchs et al. .................. 174/97 |
| 4,270,020 A | | 5/1981 | Kenworthy et al. |
| 4,404,425 A | * | 9/1983 | Rich .......................... 174/107 |
| 4,582,281 A | | 4/1986 | Van Camp |
| 4,744,010 A | | 5/1988 | Witte |
| 4,840,023 A | | 6/1989 | Borsani |
| 4,988,838 A | | 1/1991 | Kirtland |
| 5,095,822 A | * | 3/1992 | Martin .................... 174/97 X |
| 5,162,614 A | | 11/1992 | Bogiel et al. |
| 5,340,326 A | | 8/1994 | LeMaster |

FOREIGN PATENT DOCUMENTS

JP  1-270709  * 10/1989 .................. 174/48

* cited by examiner

Primary Examiner—Carl D. Friedman
Assistant Examiner—Winnie S. Yip
(74) Attorney, Agent, or Firm—Flynn, Thiel, Boutell & Tanis, P.C.

(57) ABSTRACT

A floor raceway and monument arrangement extends from a cable inlet location to one or more remote locations at which a floor mounted monument is provided, the latter typically being provided with power receptacles and communication jacks. The raceway arrangement may include an elongate rigid section suitable for extending across a walkway, which rigid section protectively encloses both power and communication cables therein, yet enables such cables to be readily laid therein and accessed. The raceway arrangement also typically includes one or more elongate flexible sections intended primarily for use in non-walkway areas. Each flexible section is defined by a plurality of cable clips which are disposed in directly adjacent relationship and are supportingly engaged on the floor. Each clip has a downwardly opening channel part which embraces a conduit-type power cable, and the clip additionally has at least one channel for receiving communication cables.

19 Claims, 5 Drawing Sheets

FLOOR RACEWAY FOR POWER AND COMMUNICATIONS CABLES

This application is filed under 35 USC §371 and represents the national stage of International Application No. PCT/US97/10573, which claims priority from U.S. Provisional Application No. 60/019,404 filed on Jun. 7, 1996.

FIELD OF THE INVENTION

This invention relates to a floor raceway and monument arrangement for permitting cables, specifically power and communication cables, to be safely disposed on and positioned along the surface of a floor.

BACKGROUND OF THE INVENTION

The feeding of power and communication cables to work stations in office environments has long presented a problem, particularly in large open areas where the cables must extend a substantial distance from a wall or floor power supply to a remotely-located monument or box provided with power receptacles and/or communication jacks. Extending the cables along the floor is generally considered unacceptable since the cables create trip points if they extend across walkways. Further, power cables provided in such instances must be encased within metal conduit, typically flexible conduit, and such conduit-encased power cables not only are unsightly but also provide an undesired upward protrusion which impedes mobility of equipment and people therearound. As to communication cables, it is typically unacceptable to extend these along the floor, particularly along walkways, since such cables are easily damaged if positioned where they can be stepped on, and accordingly the running of such cables normally also requires that they be encased within some type of protective conduit. This thus makes running of the cables unsightly and interferes with proper usage of floor space in the vicinity of the cables. With the ever expanding need for workspaces which are more open and defined generally by freestanding furniture, in contrast to panel-defined workspaces, the supplying of power and communication cabling to such workspaces is an increasing and significant problem. At present, the most successful way to overcome such problem is to feed the cables under a raised floor arrangement, which itself is a complex structure and which complicates overall installation and rearrangement of the cables, or in the alternative the cables are fed overhead above drop ceilings and are then fed downwardly at many locations through power poles, and this itself is complex and requires the usage of a large number of power poles which are often unsightly.

It is an object of this invention to provide an improved raceway and monument arrangement adapted to be mounted on the floor for permitting power and communication cables to be fed therethrough, which overall arrangement possesses a high degree of flexibility and includes both flexible and rigid sections so as to permit it to extend across walkways, thereby significantly increasing the adaptability of this arrangement so as to provide power and communication cabling access at numerous remote workstations.

The floor raceway and monument arrangement of the present invention, as briefly mentioned above, extends from a cable inlet location to one or more remote locations at which a floor mounted monument is provided, the latter typically being provided with both power receptacles and communication jacks. Several such monuments can be disposed in series along the raceway arrangement. The raceway arrangement may include an elongate rigid section suitable for extending across a walkway, which rigid section protectively encloses both power and communication cables therein, yet enables such cables to be readily laid therein and accessed. The raceway arrangement also typically includes one or more elongate flexible sections intended primarily for use in non-walkway areas. Each flexible section is defined by a plurality of cable clips which are disposed directly adjacent in side-by-side relationship and are supportingly engaged on the floor. Each clip has a downwardly opening channel part which embraces a conduit-type power cable, and the clip additionally has at least one, and in the preferred and illustrated embodiment two, channels for receiving communication cables, these latter channels always being readily accessible for laying in or removal of the cables. The construction and configuration of the cable clips enables them to be disposed either in a straight aligned relationship, or in a horizontal curvature to enable the overall raceway to be fed under and bent around furniture components or other equipment. One or more floor-type monuments are connected to the raceway arrangement, which monument connects to the conduit-encased power cable. The power cable can connect to one end of the monument as a supply, and can also connect to the other end of the monument so as to permit extension of the power cable to an additional monument if desired. The monument has a housing structure associated therewith which defines a removable top cover defining thereunder a suitable clearance passage so that communication cables can pass upwardly and over a main outlet block for extension to a further monument. One or more of the communication cables can be fed into the outlet block for connection to suitable communication jacks.

Other objects and purposes of the raceway and monument arrangement according to the present invention will be apparent upon reading the following specification and inspecting the accompanying drawings.

BRIEF DESCRIPTION OF THE DRAWINGS

FIG. 3A is an enlargement of the circled area designated 3A in FIG. 3, and shows the corrugated upper surface of the base member.

Figure 1:
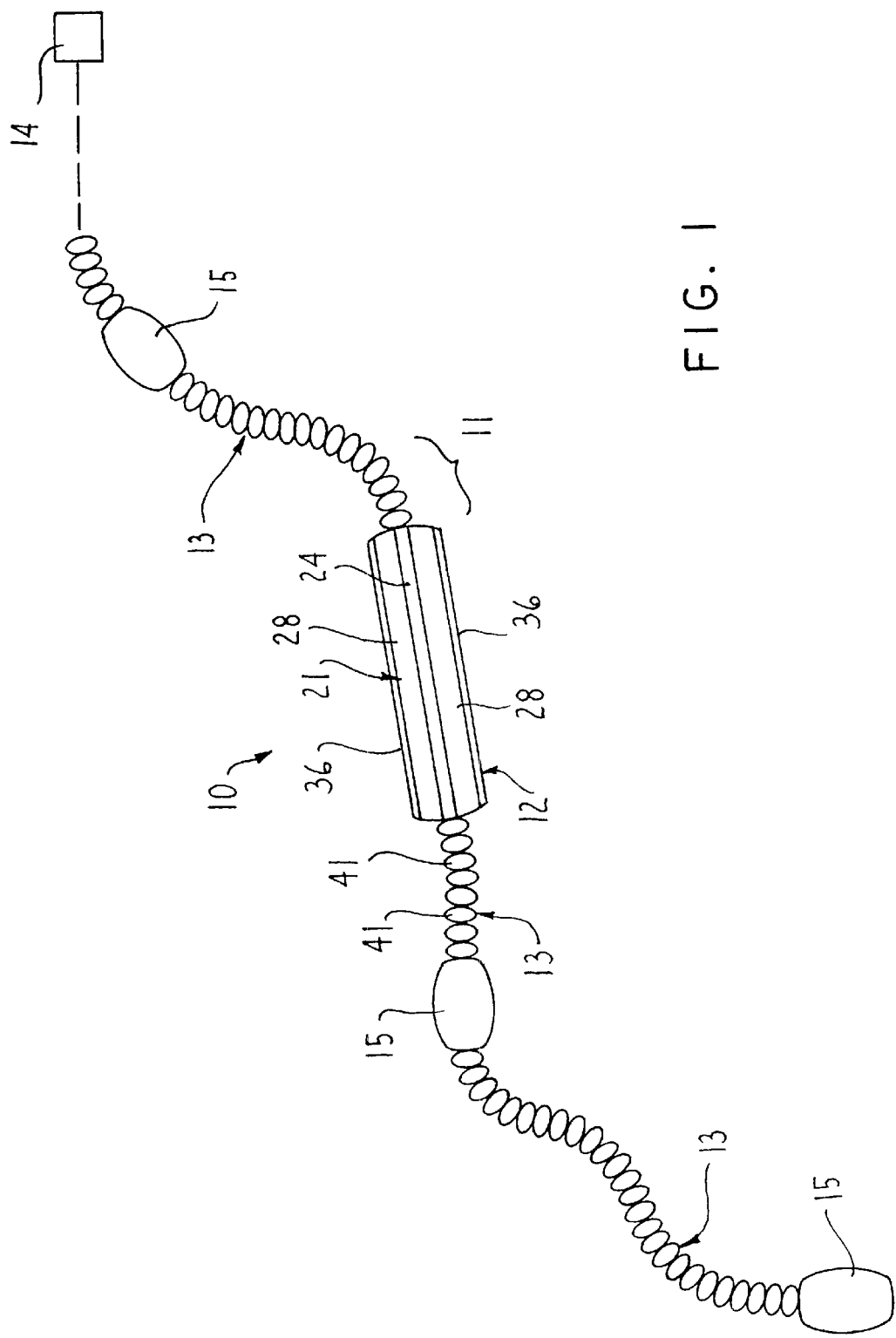
FIG. 1 is a plan view which illustrates a raceway and monument arrangement according to the present invention.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. The word "forwardly" will refer to the direction of the raceway arrangement as it extends away from the cable inlet source or location. Said terminology will include the words specifically mentioned, derivatives thereof, and words of similar import.

DETAILED DESCRIPTION

Figure 2:
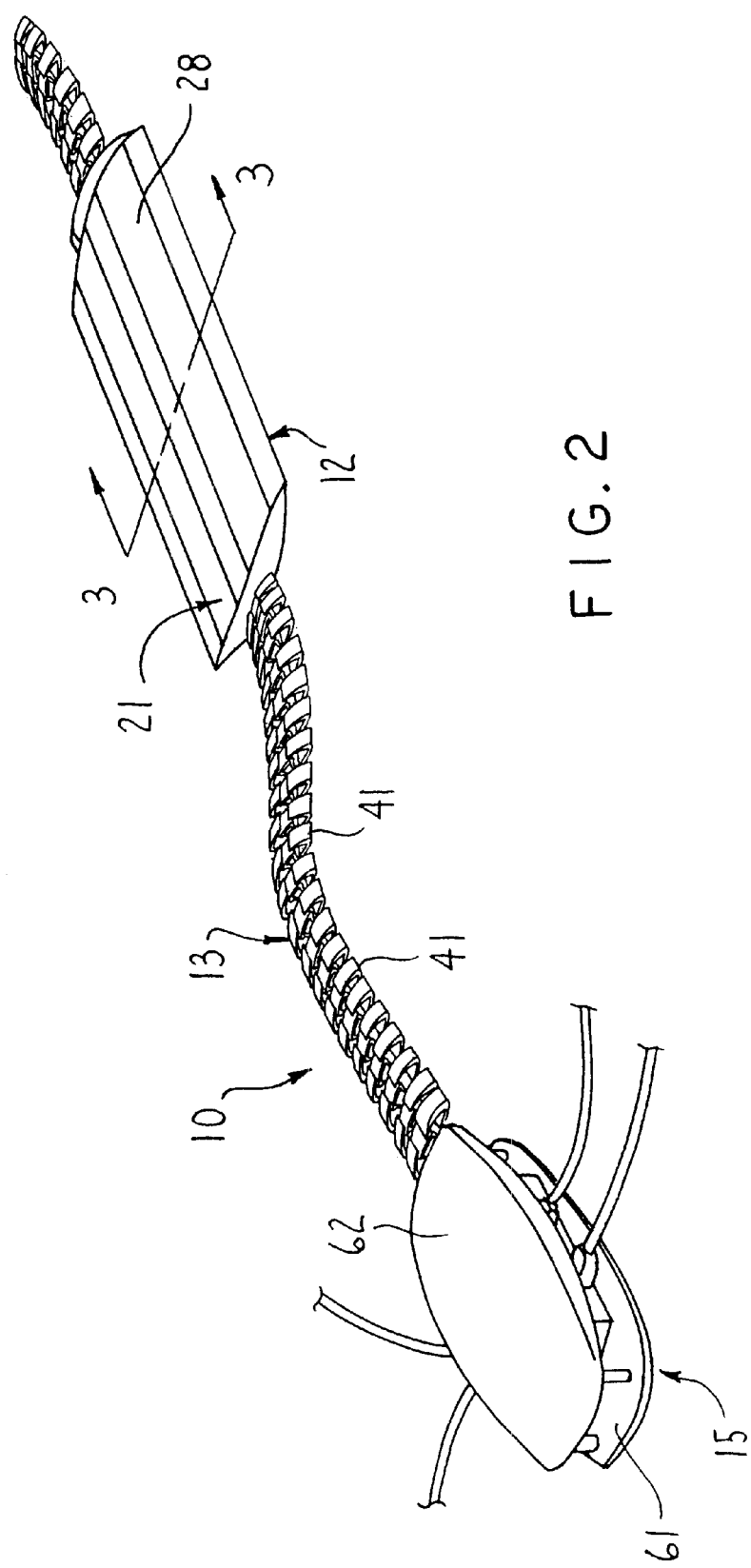
FIG. 2 is an enlarged perspective view of part of the arrangement shown in FIG. 1.

Referring to FIGS. 1 and 2, there is illustrated a floor raceway and monument arrangement 10 according to the present invention. This arrangement 10 is designed to be disposed directly in supportive engagement with a floor so as to extend therealong. Since most floors in offices and the like are covered with carpeting, the arrangement 10 is particularly designed so as to be supported directly on and engaged with the carpeting.

The arrangement 10 includes an elongate cable-guiding and confining raceway 11 which may include one or more horizontally elongate rigid sections 12 adapted particularly for extending across walkways and the like. The raceway 11 also includes one or more horizontally elongate flexible sections 13, which sections can be horizontally flexibly moved into desired curves or angles so as to permit change of direction and particularly permit the raceway arrangement to bend or turn around office furniture, equipment and the like.

The flexible sections 13 are normally positioned in areas where they are not exposed to being stepped on, namely under equipment and in other non-walkway areas.

The raceway arrangement 11, as defined by various combinations of rigid and flexible sections 12 and 13, connects at one end to a cable infeed location 14. This infeed location 14 may comprise a power post extending up to the ceiling and along which communication and power cables are fed, or it may comprise a wall or floor mounted monument or box through which power and communication cables are fed.

The floor raceway and monument arrangement 10 also includes one or more floor-mounted monuments 15, at least one of which is typically provided at the terminal end of the raceway 11, although additional such monuments 15 may be provided intermediate the raceway 11, as illustrated by FIG. 1.

Figure 3:
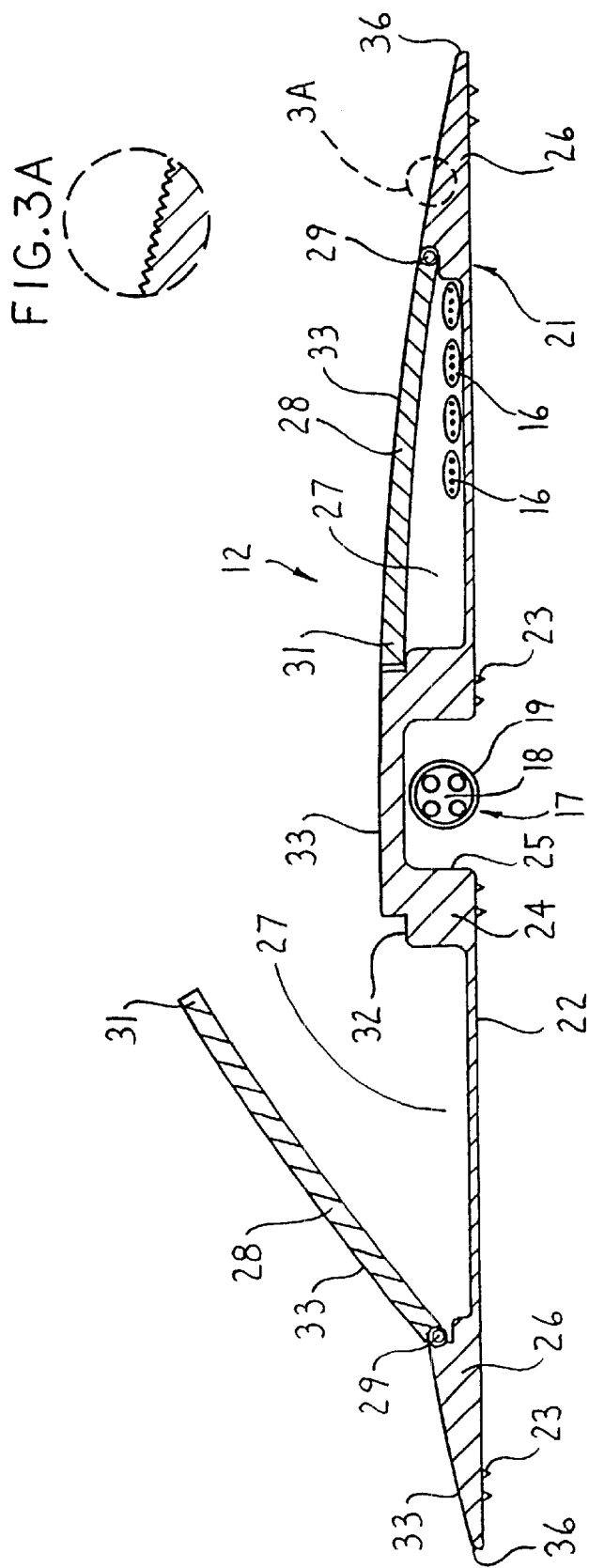
FIG. 3 is an enlarged sectional view taken along line 3—3 in FIG. 2, and showing the rigid walkway section of the raceway with one of the telecommunication channel covers in an open position.
Figure 4:
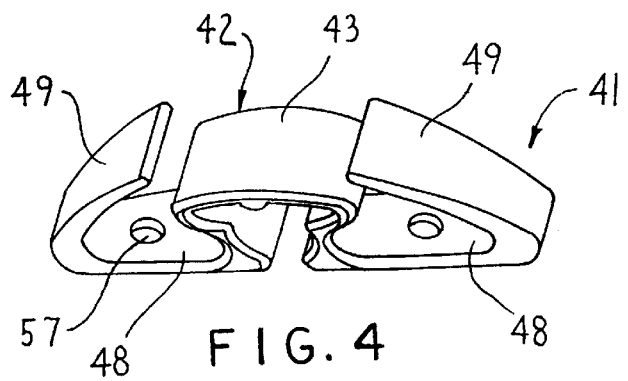
FIG. 4 is a perspective view of one of the cable clips which make up the flexible raceway section.
Figure 5:
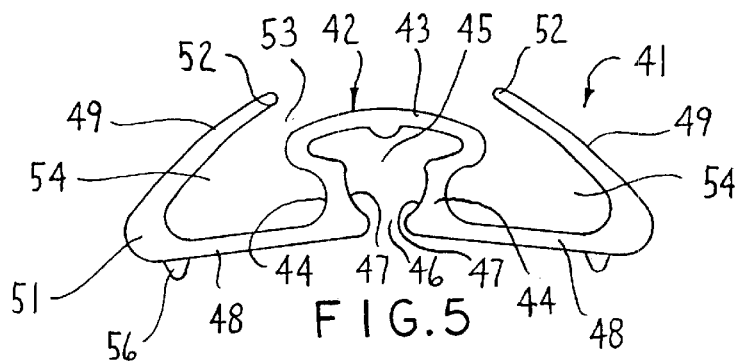
FIG. 5 is a side elevational view of the cable clip of FIG. 4.

The raceway arrangement 11 is intended to permit telecommunication cables 16 (FIG. 3) to be extended therealong from the infeed location 14 to one or more of the monuments 15 for convenient access by a user. In addition, an electrical power cable 17 (FIG. 3) also extends along the raceway 11 from the infeed location 14 for connection to one or more electrical outlets associated with one or more monuments 15. The electrical power cable 17 typically includes a plurality of electrical cables or conductors 18 encased within a flexible metal conduit or sheath 19, such being conventional and well known, with the number of electrical conductors 18 being such as to define a plurality of electrical circuits, thereby enabling a significant number of electrical outlets to be provided along the flexible floor-mount raceway arrangement 10.

Considering first the rigid raceway section 12, it includes a horizontally elongate base member 21 which has a horizontal length which is several times greater than its horizontal width. This base member 21 defines thereon a generally flat bottom surface 22 (FIG. 3) which is adapted to be positioned in direct supportive engagement with the floor, such as directly on the carpet. A plurality of downwardly projecting fingers, specifically carpet grippers 23, are normally provided on and project downwardly from the bottom surface to facilitate in securely and stationarily holding the base member 21 in engagement with the carpeted floor.

The base member 21 has a longitudinally-extending center rib part 24 which projects upwardly thorough a small vertical extent, and this center rib part 24 defines therein a longitudinally elongate channel or recess 25 which opens downwardly through the bottom surface 22. This channel 25 is sized to accommodate therein the power cable 17 which rests directly on the floor.

Base member 21 also has a pair of edge parts 26 which extend longitudinally along opposite side edges of the base member. These edge parts 26 project upwardly through a small vertical extent, and each has a generally horizontally shallow triangular cross-section such that it tapers downwardly substantially to a point directly at the free longitudinal edge 36 of the base member. These edge parts 26 extend horizontally longitudinally throughout the length of the base member, and are sidewardly spaced on opposite sides of the center rib part 24 so as to define a pair of horizontally and longitudinally extending shallow channels 27 disposed on opposite sides of the center rib part 24. These shallow channels 27, like the bottom channel 25, extend longitudinally throughout the entire length of the base member 21 so as to open outwardly through opposite ends thereof. Each channel 27 is closeable by a platelike top cover 28 which along one longitudinally extending edge thereof is hinged at 29 to the respectively adjacent edge part 26. This hinge 29 extends horizontally, and enables the cover 28 to be swingably moved between open and closed positions which respectively permit access to or closure of the respective channel 27. The free end part 31 of the cover is adapted to be supportingly engaged on a shoulder 32 defined on the center rib part 24 when the cover is closed.

The base member 21 and the covers 26 hingedly mounted thereon cooperate to define a longitudinally-extending upper surface 33 which, in transverse vertical cross-section, has a shallow upwardly-projecting arcuate curvature which extends between longitudinally-extending side edges 36 of the base member. This curved upper surface 33 being a shallow convex surface, results in the base member 21 having its greatest height substantially along the middle as defined by the center rib 24, with the height of the base member progressively decreasing due to the generally sidewardly tapered cross-section of the base member as it projects toward each side edge 36, whereby the base member provides (with the covers closed) a very shallow ramp-like structure which projects gradually upwardly toward the middle from each side thereof. This upper surface 33 defines a very gradual but continuous smooth curvature, and the vertical thickness at each side edge 36 virtually approaches a sharp edge or point so as to effectively eliminate any upright wall which could create an obstruction to people walking thereacross, or to movement of furniture or wheelchairs thereacross.

The upper surface 33 is preferably provided with a roughened texture to prevent the surface from being slippery. In a preferred embodiment, this surface 33 is preferably provided with a fine riblike structure extending longitudinally, similar to a corrugated structure, as shown in FIG. 3A, to facilitate proper frictional engagement with the shoe of a person who steps thereacross. The roughened upper surface 33 may be formed directly on the base member and covers, or may be formed on a separate covering sheet which can then be fixedly adhered to the base member and covers.

In a preferred embodiment, the base member 21 will typically have a horizontal transverse width, as measured between the side edges 36, which is at least an order of magnitude greater than the maximum vertical height as measured at the center rib 24. For example, the width as measured perpendicularly between the longitudinal side edges 36 will typically be at least about ten times greater than the maximum vertical height of the base member. The width may be in the order of about 10 inches, and the height will normally be a maximum of about one inch, and typically more in the range of ⅝ to ¾ inch.

The base member may be of metal, such as by being extruded of aluminum, or alternatively may be molded of a rigid strong plastic material. This thus enables the base member to be positioned in and extend across walkways since the base member will enable people to walk and in fact step on the base member without creating any significant obstruction, and at the same time the base member provides protection for the power and communication cables so as to enable them to extend across the walkway.

Considering now the flexible raceway section 13, same is normally defined by a plurality of cable clips 41 which are generally positioned in adjacent side-by-side relation so as to define an elongate horizontally-extending protective raceway, particularly for communication cables 16.

Figure 6:
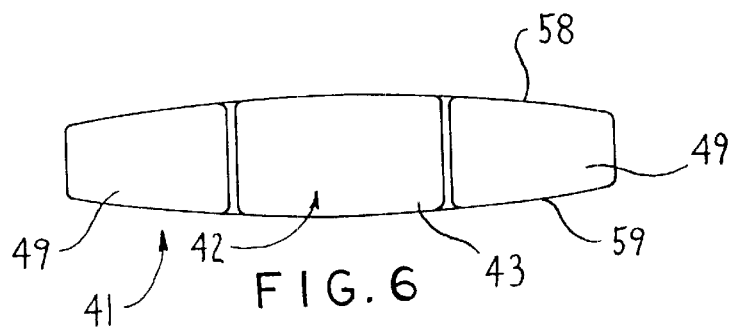
FIG. 6 is a top view of the cable clip of FIG. 4.
Figure 7:
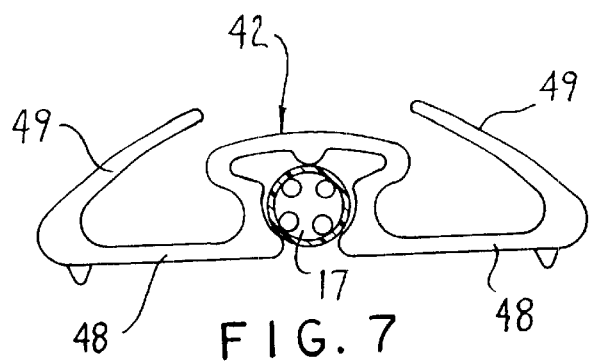
FIG. 7 is a side elevational view corresponding to FIG. 5 but showing the cable clip mounted on a conduit-encased power cable.

Referring to FIGS. 4–7, the cable clip 41 is preferably formed as a one-piece member of a plastic material and includes a center channel part 42 which has a generally rounded top wall 43 joined to a pair of downwardly projecting side legs 44, which top wall 43 and side legs 44 cooperate to define a channel 45 which opens downwardly through an open mouth 46. The side legs 44 are resiliently deflectable and define opposed arcuate parts 47 adapted for gripping engagement with opposite sides of a conduit-type power cable 17. The mouth 46 which opens into the channel 45 is narrower than the diameter of the power cable 17 so that the side legs 44 have to be resiliently deflected outwardly so as to enable the power conduit 17 to be snapped into position within the channel 45 for engagement between the opposed parts 44, substantially as illustrated by FIG. 7.

The cable clip 41 also includes generally flat bottom wall parts 48 which are fixed to lower ends of the side legs 44 and which project generally horizontally outwardly in opposite directions. The bottom wall parts 48 thus effectively project transversely or sidewardly relative to the lengthwise direction of the raceway section 13. The bottom wall parts 48 at their outer free ends join to top wall parts 49 through rather sharp but rounded bends or corners 51. Each top wall part 49 slopes upwardly but inwardly so as to be disposed vertically above the respective bottom wall part 48, with the top wall part 49 being cantilevered and terminating generally at a free end 52. This latter free end 52 is positioned generally over but vertically spaced from the channel top wall 43, being separated therefrom by a longitudinally extending slot or access channel 53 which opens inwardly and downwardly for communication with a cable-accommodating channel 54, the latter being defined between the center channel part 52, the bottom wall 48 and the top wall 49.

The bottom walls 48 are also preferably provided with projections, namely carpet grippers 56, projecting downwardly from the bottom surfaces thereof for permitting secure gripping engagement with the carpeted floor. Each bottom wall 48 is also typically provided with an opening 57 projecting vertically therethrough, which opening can be utilized for accommodating a fastener such as a screw or the like so as to permit selected ones of the cable clips 41 to be fixedly secured to the floor if necessary or desired.

The cable clip 41, when viewed from the top as illustrated in FIG. 6, has opposite side surfaces 58 and 59 which are each of a shallow arcuate convex curvature so that the center of the clip, namely the center channel part 42, provides the longitudinally widest part of the clip 41, with the longitudinally width of the clip 41 progressively decreasing until reaching the ends of the clip as defined by the bends 51. This convex curvature defined by the sides 58 and 59 thus enables a plurality of clips 41 to be effectively disposed in contacting side-by-side relationship so as to extend in the longitudinal direction of the raceway, but at the same time this convex curvature of adjacent abutting side surfaces enables the clips to define a horizontal curvature which permits the raceway to bend and curve as it projects along the floor, substantially as illustrated by FIG. 1.

Figure 9:
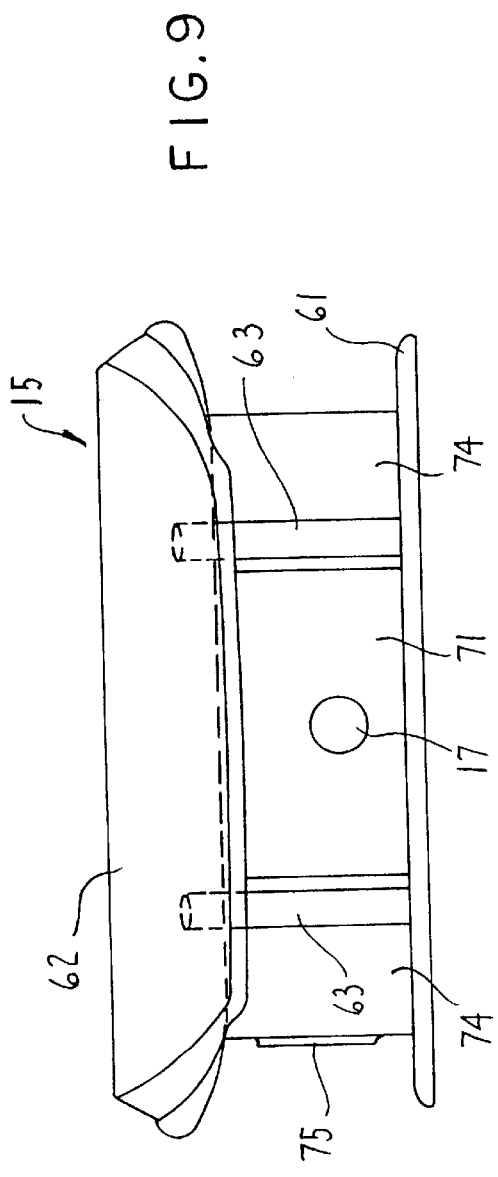
FIG. 9 is an end view of the floor monument shown in FIG. 8.
Figure 8:
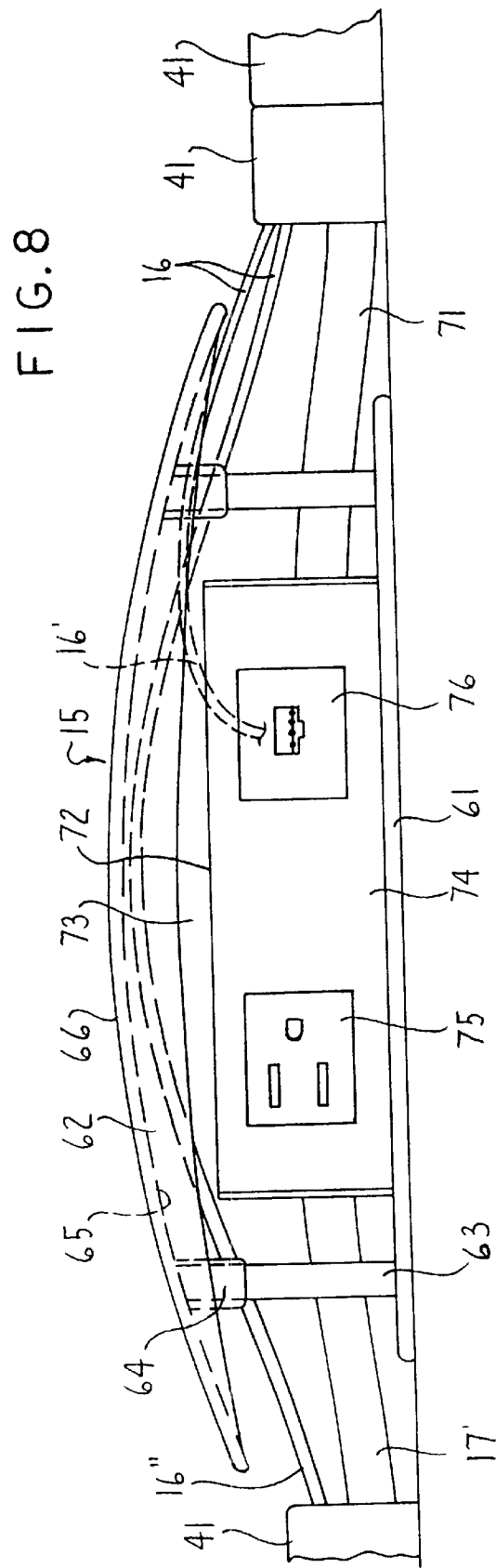
FIG. 8 is a side view of the floor monument and showing the manner in which power and communication cables are fed to and away from the outlet box.

Considering now the monument 15, and referring to FIGS. 8 and 9, the monument includes a housing structure having a base plate 61 which is adapted to be supportingly engaged directly on the floor, such as directly on the carpet, which base plate 61 will typically be fixedly secured to the floor by screws or other fasteners (not shown). The monument housing also includes a removable top cover 62 which is supported in upwardly spaced relation from the base plate 61 by a plurality of upright posts 63 which are fixed to and project upwardly from the base plate, with upper ends of these posts 63 being slidably but removably engaged within sleevelike hubs 64 which are fixed to and project downwardly from the undersurface 65 of the top plate 62. The top plate 62, in the illustrated embodiment, is preferably provided with a top surface 66 which is suitably rounded at least in the lengthwise direction thereof so as to define an upwardly projecting rounded convex surface which is highest substantially at the middle thereof.

The monument 15 also includes a power box or housing 71 which is stationarily mounted on the base plate 61 beneath the top cover 62. This power box 71 has a generally flat top surface or wall 72 which is spaced downwardly from the undersurface 65 of the cover 62 so as to define a clearance space or channel 73 therebetween. A separate outlet box 74 is preferably attached to each side of the power box 71, which outlet box 74 in a side surface thereof may be provide with one or more conventional electrical outlets 75, such as a conventional three-hole receptacle for receiving a conventional three-prong electrical plug, and one or more conventional telecommunication jacks 76, such as a standard telephone jack. By having the outlet boxes 74 removably attached to opposite sides of the power box 71, this thus facilitates the removal and modifying of the outlet box 74 to provide the desired electrical and communication outlets, or a combination thereof, and then the subsequent reattachment of the outlet box 74 to the power box 71.

In use, the power cable 17 will extend to and connect to one end of the power box 71 so as to supply the individual electrical conductors 18 into the interior of the box 71. Suitable electrical conductors can then be electrically joined to the receptacles 75 associated with the outlet boxes 74. If the monument is not at the terminal end of the raceway arrangement, then the electrical conductors can extend through the power box 71 and be joined to a further power cable 17' (FIG. 8) for extension to another monument such as illustrated in FIG. 1. In addition, communication cables 16 as illustrated in FIG. 8 can be supplied to and through the monument. For example, if several communication cables 16 are supplied to the monument 15, one or more of these cables can be connected to jacks 76 associated with the monument 15. As illustrated by FIG. 8, one of the communication cables designated 16' will be fed downwardly into the power box 71 and then into the outlet box 74 for connection to the outlet jack 76. Others of the communication cables, such as indicated at 16" in FIG. 8, can be fed through the monument by being protectively fed through the clearance channel 73 so as to exit out the other side of the monument to hence be fed to a subsequent monument. These latter communication cables 16" can be freely laid over the power box 71 when the cover 62 is removed, with the cable being confined between the sidewardly spaced pairs of uprights 63, whereupon remounting of the cover 62 thus causes the communication cables 16" to be vertically confined below the cover 62 and sidewardly confined between the sidewardly spaced uprights 63. This thus confines and protectively encloses the communication cables 16" as they pass through the monument.

As indicated by FIGS. 8 and 9, the cover 62 is sufficiently enlarged both sidewardly and longitudinally so as to significantly horizontally overhang both the width and length dimensions of the power and outlet boxes 71 and 74. This thus facilitates the feeding of the cables to and through the power boxes, and in addition the sideward overhang of the cover 62 provides a partial shield over the electrical receptacles 75 and the communication jacks 76.

The cables entering or exiting the opposite ends of the monument 15 will, as illustrated by FIG. 8, typically be associated with flexible raceway sections 13 as defined by a plurality of sidewardly adjacent cable clips 41. The cable clips 41 will normally extend up to a position closely adjacent the end of the monument so as to maximize the protective enclosure of the cables.

The assembly and use of the floor raceway and monument arrangement 10 of this invention will now be briefly described.

The conduit-type power cable 17 will typically first be positioned along the floor so as to extend outwardly from the infeed location 14, with the cable 17 being oriented and configured so as to extend to the desired locations for the monument 15. The monument 15 will similarly be positioned as desired for connection between segments of the power cable 17. If the raceway arrangement is extending across walkways, then a base member 21 will be provided so as to extend across each walkway, preferably in perpendicular relationship to the longitudinal direction of the walkway. The base member 21 will be positioned in engagement with the carpeted floor so that the power cable 17 is disposed within the bottom channel 25. Thereafter, a plurality of cable clips 41 will be snapped downwardly over the power cable 17 so as to be pushed into gripping engagement with the carpeted floor, with a series of such clips 41 being positioned in side-by-side relationship along the extending sections of power cable 17 so as to substantially totally fill the longitudinal region which extends between the monuments, the base members, and the infeed location.

After the walkway base members 21 and cable clips 41 have been positioned as described above, then the communication cables 16 can be fed longitudinally along the raceway. These cables are fed into the channels 27 of the walkway base member 21 merely by opening the covers 28 and feeding the cabling through the channels 27, and then closing the covers. Similarly, the communication cables 16 can be inserted into either of the cable channels 54 associated with the series of cable clips 41 by inserting the cables through the access opening 53. The cables 16 are then connected to the individual monuments 15, or passed through the monument, by first removing the monument cover 62 to enable access to the top of the monument, and then repositioning the cover 62 after the communication cables 16 have been fed over the power box 71.

With the raceway arrangement assembled as briefly described above, communication cables 16 can be readily moved or changed since all of the confining channels, such as the clearance channel 73 in the monument, the cable channels 54 in the clips 41, and the cable channels 27 in the walkway base member 21, are all in longitudinally open and continuous communication with one another and are all vertically accessible with obstructions, thereby greatly facilitating laying in or removing of a continuous elongate communication cable. Further, if a flexible section 13 of the communication cable is accidentally stepped on, the top walls 49 may flex downwardly but, if they do so, the free ends 52 thereof will abut the top wall 43 of the center channel part, and thereby prevent collapsing of the top wall onto the cables contained within the channel 54. Once the pressure is removed from the top wall 49, it will again resiliently deflect upwardly into its normal position so as to again provide ready access to the cable channel 54.

The cable clip 41 is preferably constructed in one piece of a plastic material, such as by being molded of a suitable strong but somewhat elastically flexible material.

Although a particular preferred embodiment of the invention has been disclosed in detail for illustrative purposes, it will be recognized that variations or modifications of the disclosed apparatus, including the rearrangement of parts, lie within the scope of the present invention.

We claim:

1. A floor raceway arrangement for power and communication cables, comprising:

horizontally elongate flexible raceway section defining a first channel for accommodating a longitudinally elongate power cable and at least a second channel for accommodating a longitudinally elongate communication cable, said flexible raceway section being defined by a plurality of cable-accommodating clips positioned in adjacent side-by-side relationship along said longitudinal direction of said flexible section, each said clip having a bottom wall for direct supportive engagement with the floor, each said clip also defining a channel part which opens downwardly toward the floor for accommodating said power cable therein, said channel part having means for gripping engagement with the power cable, each said clip also having an upper wall part which is positioned over and cooperates with said bottom wall for defining said second channel therebetween, said second channel being continuously accessible through an access opening which opens sidewardly through said clip.

2. A raceway arrangement according to claim 1, wherein the channel part is defined at the center of said clip and has downwardly projecting side legs which define said first channel therebetween, said bottom wall including a pair of sidewardly spaced bottom wall parts which are joined to and project sidewardly in opposite directions from lower ends of said side legs, and said upper wall part including a pair of sidewardly spaced top wall parts which are joined respectively to and project upwardly and inwardly from said bottom wall parts, said top wall parts cooperating with the respective bottom wall parts to define a pair of said second channels, said pair of said second channels being disposed on opposite sides of said channel part, and said top wall parts terminating in free ends which are positioned over but spaced from said channel part so as to define access openings therebetween which communicate with the respective second channels.

3. A raceway arrangement according to claim 1, including a longitudinally elongate rigid raceway section connected in series with said flexible section, said rigid section including a longitudinally elongate rigid base member which has a length which is significantly greater than its horizontal width, and said horizontal width is significantly greater than the maximum vertical height of the base member, the base member defining a longitudinally extending downwardly opening channel for accommodating the power cable therein, the base member also defining a pair of cable-accommodating channels disposed on opposite sides of said downwardly opening channel and opening upwardly, the base member having covers pivotally mounted thereon for closing off the upper end of each said cable-accommodating channel, and said base member and said covers defining a transverse profile which defines a shallow upwardly protruding curvature so that the base member terminates substantially at a triangular apex along each longitudinal edge thereof with the raceway defining shallow ramplike upper surfaces which slope upwardly from opposite longitudinal edges toward one another and define a rounded top surface where they merge.

4. A raceway arrangement according to claim 1, including a monument connected in series with said flexible section, said monument comprising a base plate which mounts on the floor and supports a power box thereon, said power box permitting one or more power and communication outlets to be mounted thereon, a top cover structure positioned over and in upwardly spaced relation from said power box and being removably attached relative to said base plate, and sidewardly spaced guide posts extending vertically between said cover and said base plate for defining a guide channel which extends under the cover but above the power box for guidably enclosing communication cables therein as said communication cables extend through the monument.

5. A raceway arrangement according to claim 3, wherein said rigid raceway section includes a plurality of carpet grippers extending downwardly from said base member for engagement with carpeting to hold said rigid raceway section stationary.

6. A raceway arrangement according to claim 4, wherein said top cover structure extends beyond said base plate in all directions so as to partially shield said power box and said power and communication cables.

7. A cable-accommodating rigid raceway structure for extending across a walkway defined on a floor, comprising a longitudinally elongate rigid base member having a generally flat bottom surface for supportive engagement with the floor, said base member having a transverse width which extends between longitudinally extending side edges which is significantly greater than the maximum height of the base member but which is also significantly less than the longitudinal length of the base member, the base member defining a first downwardly-opening channel therein and extending longitudinally throughout the length thereof for accommodating a power cable, the base member defining therein a pair of longitudinally extending second channels which open upwardly and also outwardly through opposite ends of said base member, said second channels being disposed in generally parallel relationship and positioned on opposite sides of said first channel, said second channels accommodating telecommunication cables therein, and rigid load-supporting covers mounted on said base member for closing off the upper extremity of said second channels, said covers and said base member having an upper surface which, in transverse vertical profile, has a shallow upwardly arcuate curvature so that the maximum height is generally at the center of the base member with said height progressively decreasing so that opposite longitudinal edges of the base member define a narrow edge.

8. A walkway arrangement according to claim 7, wherein said base member closes off the bottoms of said second channels, and wherein said covers are individually hingedly coupled to said base member along longitudinally extending edges thereof so as to be swingably moveable between open and closed positions.

9. A raceway structure according to claim 7, wherein said rigid raceway section includes a plurality of carpet grippers extending downwardly from said base member for engagement with carpeting to hold said rigid raceway stationary.

10. A floor monument for use in conjunction with a floor raceway arrangement along which power and communication cables extend, said monument including a base plate mountable on the floor and supporting a power box, said power box permitting one or more power and communication outlets to be mounted thereon, a top cover structure positioned over and in upwardly spaced relation from said power box and being removably attached relative to said base plate, and sidewardly spaced guide posts extending vertically between said cover and said base plate for defining a guide channel which extends under the cover but above the power box for guidably enclosing communication cables therein as said communication cables extend through the monument.

11. A floor monument according to claim 10, wherein said top cover structure extends beyond said base plate in all directions so as to partially shield said power box and said power and communication cables.

12. A floor monument according to claim 10 wherein a pair of spaced-apart, sleeve-like hubs project downwardly from an underside of said cover and said guide posts project upwardly from said base plate and are slidably but removably engaged within the respective hubs.

13. A cable accommodating clip for a floor raceway arrangement for power and communication cables, comprising:

a bottom wall defining a flat, floor engaging surface for direct supportive engagement with the floor and including a connector configured to engage the floor, a channel part which defines a first channel which opens downwardly for accommodating a power cable therein, said channel part having a pair of oppositely disposed and resiliently deflectable legs in gripping engagement with said power cable, said legs together defining a mouth of said first channel, said mouth having a width dimension defined between lower ends of said legs which is substantially less than a width dimension of said first channel defined between inwardly facing surfaces of said legs spaced upwardly from said lower ends, a top wall which extends over and cooperates with said bottom wall and defines at least one second channel therebetween, each of said first and second channels extending through opposite sides of the clip, said second channel being accessible through an access opening which opens transversely through said top wall to permit a communication cable to be laid into said second channel.

14. A cable accommodating clip according to claim 13, wherein said channel part is defined at the center of said clip and said legs project downwardly and define said first channel therebetween, said bottom wall including a pair of sidewardly spaced bottom wall parts which are joined to and project sidewardly in opposite directions from lower ends of said legs, and said top wall including a pair of sidewardly spaced top wall parts which are joined respectively to and project upwardly and inwardly from said bottom wall parts, said top wall parts cooperating with the respective bottom wall parts to define a pair of said second channels, said pair of said second channels being disposed on opposite sides of said channel part, and said top wall parts terminating in respective free ends which are positioned adjacent but spaced from said channel part so as to define a pair of said access openings which communicate with the respective second channels.

15. A cable accommodating clip according to claim 13 wherein said legs are side legs and said channel part is disposed generally at a center of said clip and includes an upper leg which extends between upper ends of the respective side legs, said side legs project downwardly and together with said upper leg define said first channel, said bottom wall includes a pair of sidewardly spaced bottom wall parts which are joined to and project sidewardly in opposite directions from lower ends of said side legs, said top wall includes a pair of sidewardly spaced top wall parts which are joined respectively to and project upwardly and inwardly from said bottom wall parts, said top wall parts cooperating with the respective bottom wall parts to define a pair of said second channels disposed on opposite sides of said channel part, and said top wall parts terminating in respective free ends which are spaced from said channel part so as to define a pair of said access openings which communicate with the respective second channels, said top wall parts being at least partially flexible and said free ends thereof being disposed over and in overlapping relation with said upper leg such that if a downwardly directed force is applied to said top wall parts, said free ends abut said upper leg and prevent collapsing of said top wall parts onto cables located within the respective second channels.

16. A cable accommodating clip according to claim 13 wherein said second channel is continuously accessible through said access opening.

17. A cable-accommodating rigid raceway structure for extending across a walkway defined on a floor, comprising a rigid base member having a bottom surface for supportive engagement with the floor, said base member defining a first downwardly-opening channel therein for accommodating a power cable, the base member defining therein a pair of generally upwardly-opening second channels positioned on opposite sides of said first channel and accommodating telecommunication cables therein, and rigid load-supporting covers mounted on said base member for closing off the upper extremity of said second channels, said covers and said base member together defining an upper surface which has a shallow upwardly arcuate curvature so that the maximum height is generally at the center of the base member with said height progressively decreasing toward opposite side edges of the base member.

18. A raceway structure according to claim 17 wherein said covers are individually hingedly coupled to said base member along said side edges thereof so as to be swingably movable between open and closed positions.

19. A raceway structure according to claim 17 wherein said base member includes a plurality of carpet grippers extending downwardly therefrom for engagement with carpeting to hold said raceway structure stationary.

* * * * *